(12) United States Patent
Magno, Jr.

(10) Patent No.: US 8,338,706 B2
(45) Date of Patent: Dec. 25, 2012

(54) PROTECTIVE COVER

(75) Inventor: Joey D. Magno, Jr., Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 251 days.

(21) Appl. No.: 12/831,298

(22) Filed: Jul. 7, 2010

(65) Prior Publication Data

US 2011/0005800 A1 Jan. 13, 2011

Related U.S. Application Data

(60) Provisional application No. 61/224,091, filed on Jul. 9, 2009.

(51) Int. Cl.
*H01H 9/02* (2006.01)

(52) U.S. Cl. ............... 174/58; 174/61; 174/66; 174/67; 220/3.2; 220/242

(58) Field of Classification Search ............ 174/66, 174/67, 53, 57, 58, 50, 135, 61; D13/177, D13/156; 220/241, 242, 3.2, 3.3, 3.7; 33/DIG. 10, 33/528; 29/426.2
See application file for complete search history.

(56) References Cited

U.S. PATENT DOCUMENTS

| | | |
|---|---|---|
| 946,646 A | 1/1910 | Pratt |
| 1,550,870 A | 8/1925 | Braden |
| 1,724,307 A | 8/1929 | Peterson |
| 1,883,457 A | 10/1932 | Arnold |
| 1,935,565 A | 11/1933 | Goetzelman |
| 1,956,196 A | 4/1934 | Korab |
| 2,204,006 A | 6/1940 | Allen et al. |
| 2,573,260 A | 10/1951 | Gorman |
| 2,788,151 A | 4/1957 | Shore |
| 2,791,345 A | 5/1957 | Troutman |
| 2,815,114 A | 12/1957 | Tracy |
| 2,894,656 A | 7/1959 | Tomlin |
| 2,895,634 A | 7/1959 | Comroe |
| 3,015,408 A | 1/1962 | Campbell et al. |
| 3,059,803 A | 10/1962 | Holsinger |
| 3,061,083 A | 10/1962 | Hubbell, Jr. |
| 3,601,276 A | 8/1971 | Culpepper |
| 3,745,664 A | 7/1973 | Altseimer |
| 3,859,454 A | 1/1975 | Mann |
| 3,928,716 A | 12/1975 | Marrero |
| 4,051,321 A | 9/1977 | Buell |
| 4,247,738 A | 1/1981 | Bonato |
| D261,135 S | 10/1981 | Horne |
| 4,541,538 A | 9/1985 | Swetnam |
| 4,717,358 A | 1/1988 | Chaundy |
| 4,907,711 A | 3/1990 | Stuchlik, III |
| 4,953,733 A | 9/1990 | Loscuito |
| 4,979,633 A | 12/1990 | Lakey |
| 5,003,128 A | 3/1991 | Grondin |
| 5,012,043 A | 4/1991 | Seymour |
| 5,063,872 A | 11/1991 | Maus et al. |
| D345,142 S | 3/1994 | Porter |

(Continued)

*Primary Examiner* — Angel R Estrada

(74) *Attorney, Agent, or Firm* — Snyder, Clark, Lesch and Chung, LLP

(57) ABSTRACT

An assembly includes a mud ring and a detachable cover. The mud ring includes a planar surface including slots for mounting the mud ring to a utility box. The mud ring also includes a raised portion comprising side walls and end walls, the raised portion being elevated with respect to the planar surface. The detachable cover is connected to the raised portion by at least one hinged mechanism, the hinged mechanism being configured to be broken away from the mud ring.

20 Claims, 4 Drawing Sheets

U.S. PATENT DOCUMENTS

| | | |
|---|---|---|
| 5,301,437 A | 4/1994 | Burke |
| 5,342,995 A | 8/1994 | Comerci et al. |
| 5,359,152 A | 10/1994 | Hone-Lin |
| 5,432,298 A | 7/1995 | Thompson |
| 5,448,011 A | 9/1995 | Laughlin |
| 5,526,952 A | 6/1996 | Green |
| 5,531,345 A | 7/1996 | Nakamura et al. |
| 5,562,222 A | 10/1996 | Jordan et al. |
| 5,639,991 A | 6/1997 | Schuette |
| 5,710,392 A | 1/1998 | Bordwell et al. |
| 5,723,816 A | 3/1998 | Neece |
| 5,773,760 A | 6/1998 | Stark et al. |
| 5,902,960 A | 5/1999 | Smith |
| 5,927,667 A | 7/1999 | Swanson |
| 6,103,974 A | 8/2000 | Erdfarb |
| 6,166,329 A | 12/2000 | Oliver et al. |
| 6,209,836 B1 | 4/2001 | Swanson |
| 6,317,995 B1 | 11/2001 | Hoffmann, Sr. |
| 6,462,278 B1 * | 10/2002 | Vrame .................. 174/67 |
| 6,608,252 B2 | 8/2003 | Hurley |
| 6,619,477 B2 | 9/2003 | Takahashi |
| 6,683,248 B2 | 1/2004 | Vrame et al. |
| 6,686,540 B2 | 2/2004 | Compagnone, Jr. |
| 6,906,260 B2 | 6/2005 | Grendahl |
| D528,513 S | 9/2006 | Grendahl |
| 7,718,893 B2 * | 5/2010 | Purves et al. ............ 174/53 |
| 7,935,887 B2 * | 5/2011 | Petak .................. 174/66 |
| 2008/0236859 A1 | 10/2008 | de la Borbolla |

\* cited by examiner

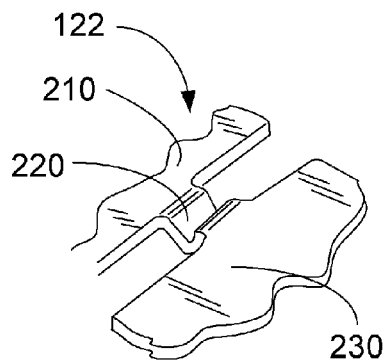
FIG. 2A
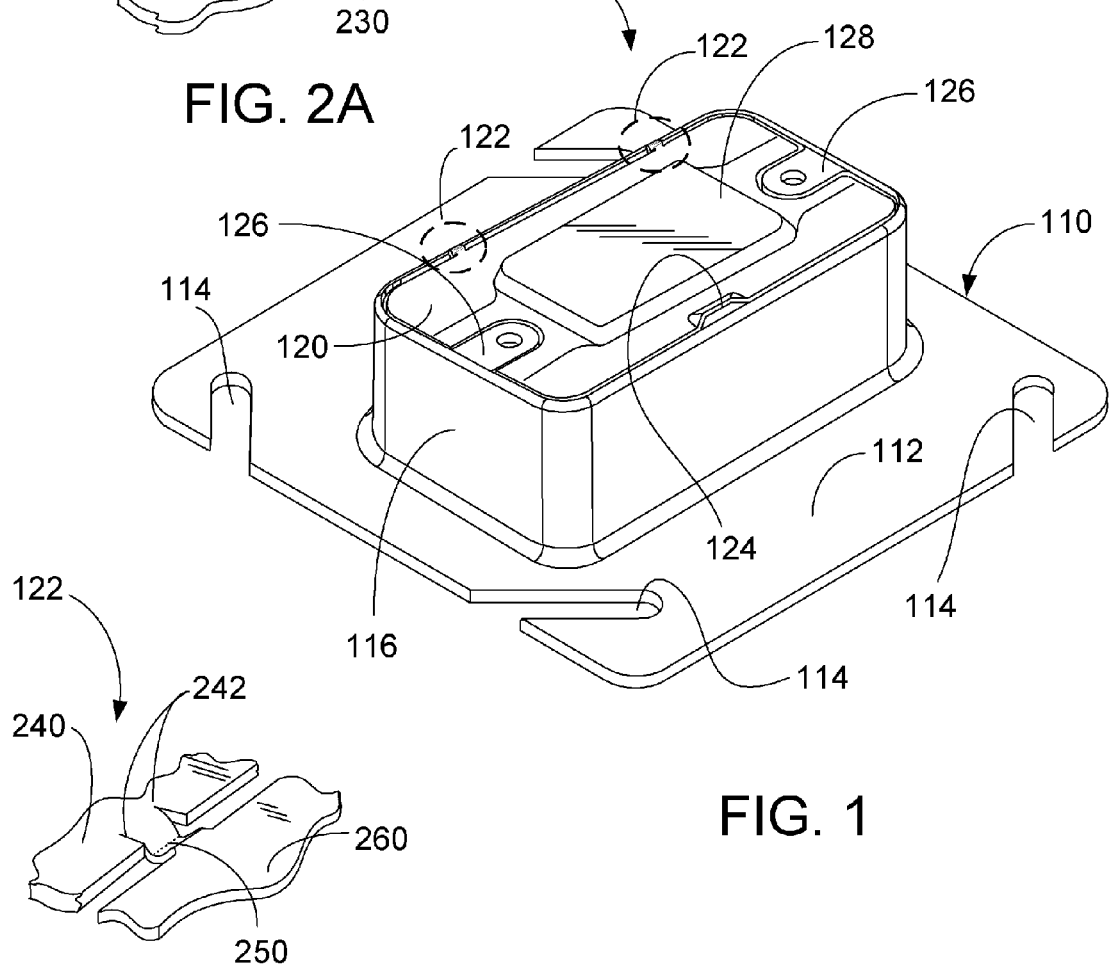
FIG. 2B
FIG. 1

PROTECTIVE COVER

RELATED APPLICATION

This application claims priority under 35 U.S.C. §119 based on U.S. Provisional Patent Application No. 61/224,091, filed Jul. 9, 2009, the disclosure of which is hereby incorporated herein by reference.

BACKGROUND INFORMATION

Electrical utility boxes are often mounted in walls prior to completion of the wall structure. For example, an electrical utility box may be mounted on wall studs prior to drywall installation. In some instances, a mud ring may be connected to the utility box to ensure that the stud-mounted utility box and/or electrical device mounted to the utility box will be flush with the finished drywall.

During wall installation, the contents of the utility box may inadvertently become damaged by drywall saws or other devices. For example, drywall is often installed in uncut sheets over the stud-mounted electrical boxes and mud rings. After the drywall is attached, the installer cuts openings in the drywall with a power saw or knife to expose the electrical box/mud ring. The installer, however, often inadvertently cuts or otherwise damages the electrical box/mud ring and/or any electrical devices or wiring that may be mounted in the electrical box/mud ring. In some instances, a protective cover may be used to cover the electrical utility box during wall installation.

Conventional protective covers, however, are fabricated separately from the electrical boxes/mud rings and are attached to the electrical boxes/mud rings in the field using multiple screws. As a result, the covers and/or screws are often not available (e.g., lost, misplaced, not ordered) to the installer when needed. In addition, the covers and/or screws used to attach the covers to the electrical boxes/mud rings often do not fit the electrical boxes/mud rings being used.

BRIEF DESCRIPTION OF THE DRAWINGS

FIG. 1 is a perspective view of a mud ring with a protective cover in the closed position consistent with an exemplary implementation;

FIGS. 2A and 2B are details illustrating the hinged connection of the protective cover to the mud ring of FIG. 1 according to exemplary implementations;

DETAILED DESCRIPTION OF PREFERRED EMBODIMENTS

Figure 3:
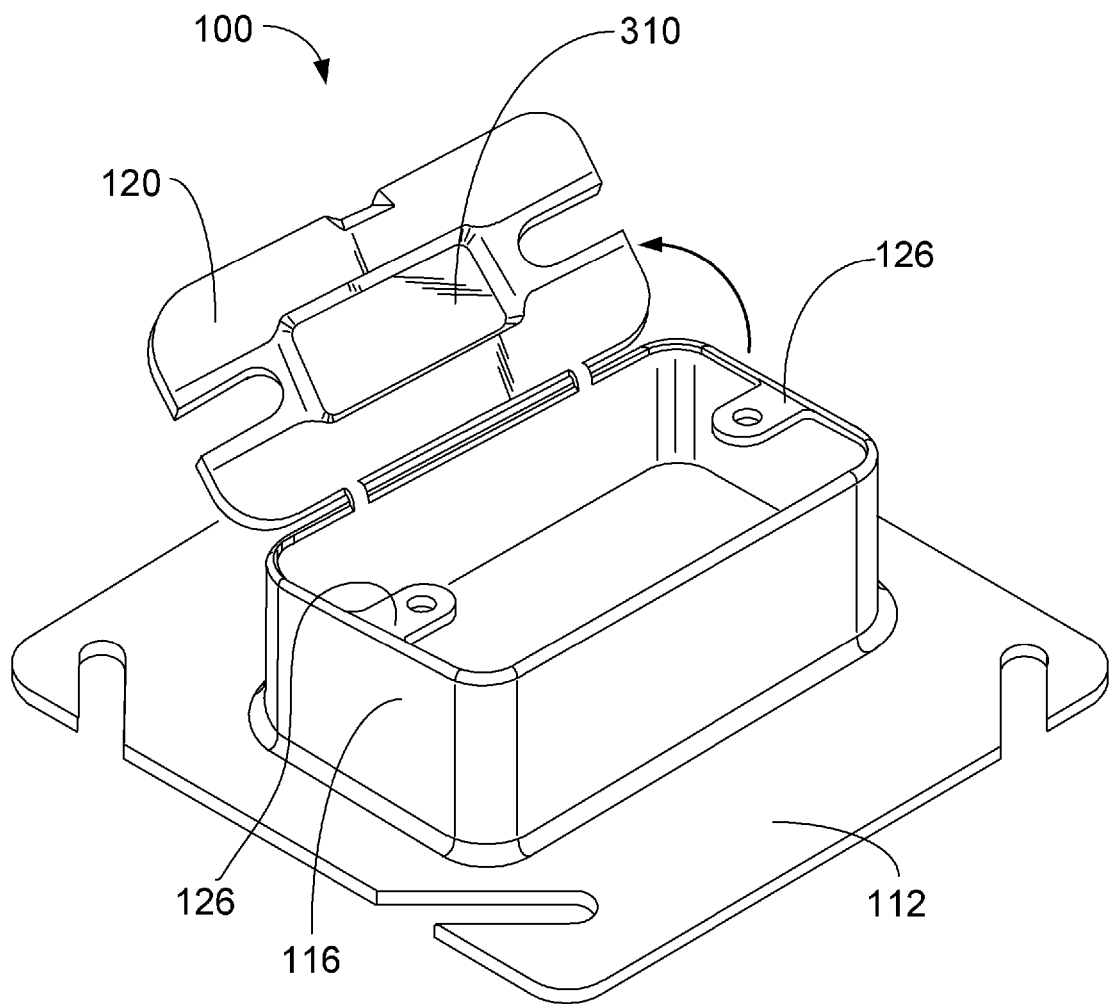
FIG. 3 is a perspective view of the protective cover attached to the mud ring of FIG. 1 in an open position.

The following detailed description refers to the accompanying drawings. The same reference numbers in different drawings may identify the same or similar elements. Also, the following detailed description does not limit the invention.

Embodiments described herein provide a protective cover that may be used in combination with a utility box and/or mud ring to protect contents of the utility box during construction.

In an exemplary implementation, a mud ring may include an integrated, hinged cover that may be closed to protect the contents of the utility box during wall construction or during other construction-related activities that may damage the mud ring, utility box and/or devices connected to the mud ring or utility box. The cover may be designed to be broken away or detached from the mud ring after the wall construction or other construction activity is completed.

FIG. 1 depicts an exemplary assembly 100 consistent with embodiments described herein. Referring to FIG. 1, assembly 100 includes mud ring 110 with integrated, protective cover 120 (shown in a closed position). In an exemplary implementation, mud ring 110 and protective cover 120 may be fabricated together and may include the same material, such as steel (e.g., galvanized steel), aluminum or some other metal. In other implementations, mud ring 110 and protective cover 120 may be fabricated using other materials, such as plastic or composite materials. In still other instances, mud ring 110 and protective cover 120 may be fabricated from different materials. In an exemplary implementation, cover 120 may be at least one sixteenth of an inch in thickness.

Mud ring 110 may include a base or planar portion 112 that includes slots 114 that may receive screws or other fasteners for mounting mud ring 110 to a utility box (not shown in FIG. 1) or wall studs. Mud ring 110 may also include a generally rectangular, raised portion 116 that is elevated or raised above the surface of base 112. In an exemplary implementation, raised portion 116 may be fabricated with base 112 via a stamping operation. In such an implementation, the areas where raised portion 116 and base 112 meet may be curved or sloped, as illustrated in FIG. 1. The particular slope or radius of curvature where raised portion 116 and base 112 meet may vary based on the particular mud ring 110. However, it should be understood that various degrees of slope or curvature between base 112 and raised portion 116 may be possible. In addition, the upper portion of raised portion 116 (e.g., adjacent cover 120) may also be sloped or curved, as illustrated in FIG. 1.

Raised portion 116 may range in height from, for example, one quarter of an inch to two or more inches. Raised portion 116 may be designed to allow mud ring 110 to fit flush with a completed wall. In some implementations, mud ring 110 may be adjustable in height. For example, raised portion 116 may be adjusted in height above base 112 using adjusting locking screws that allow raised portion 116 to extend a distance ranging from one quarter of an inch to two or more inches above base 112, based on the particular wall thickness and installation scenario.

Cover 120 may be connected to raised portion 116 at hinged areas 122 (also referred to herein as hinged portions 122). For example, in one implementation, two hinged areas 122 may connect cover 120 to the raised portion 116 of mud ring 110. In other implementations, more or fewer hinged areas 122 may be used to connect cover 120 to mud ring 110. For example, in one implementation, a singled hinged area 122 may connect cover 120 to mud ring 110. In each case, hinged areas 122 may be designed to allow cover 120 to be easily broken away or detached from mud ring 110 after wall construction is completed. For example, in one implementation, after mud ring 110 is connected to a utility box and an electrical device is connected to mud ring 110, a user/installer may simply flip cover 120 back and forth several times until cover 120 breaks off at hinged areas 122, as described in more detail below.

Cover 120 may also include a pry out tab or opener 124 that allows a user to open/close cover 120. In an exemplary implementation, opener 124 may include a small raised area, such as a tab or lip, that allows a user to easily grasp opener 124 with his/her finger to open/close cover 120. In other implementations, opener 124 may include a small, slot-like area in which a user may insert a screwdriver or other flat object to pry open cover 120. In each case, opener 124 may allow the user to easily open/close cover 120.

Mounting tabs 126 may located on each end of raised portion 116. In an exemplary implementation, tabs 126 may include threaded holes for receiving screws that allow an electrical device to be attached to mud ring 110. For example, a receptacle (e.g., a ground fault circuit interrupter (GFCI) type duplex receptacle), an electrical switch, or other electrical or communication-related devices may be mounted to mud ring 110 by inserting and tightening screws into tabs 126.

In an exemplary implementation, cover 120 may include a raised or contoured area 128, as illustrated in FIG. 1. Contoured area 128 may be contoured or embossed to accommodate an electrical device that may be mounted to mud ring 110. This contoured/embossed area 128 may provide relief to the offset height of the electrical device and may extend throughout the top and bottom to provide relief to the thickness of the device's mounting ears. For example, a GFCI duplex receptacle may be mounted to tabs 126. In this case, contoured area 128 may fit over the GFCI receptacle and allow cover 120 to completely close to cover the GFCI receptacle and prevent damage or debris from entering the GFCI receptacle and/or electrical box coupled to mud ring 110. Contoured area 128 may also provide relief to tabs 126 when an electrical device is mounted to tabs 126 since contoured area 128 will easily accommodate the electrical device. In addition, contoured area 128 may be embossed with information identifying the type of electrical device which may be accommodated by cover 120.

In other implementations, contoured area 128 may be designed to fit over a number of different electrical devices. For example, contoured area 128 may accommodate a standard duplex receptacle, a toggle type light switch, a rocker type switch, etc. In such implementations, cover 120 may act as a universal cover and may be used in connection with any number of electrical or communication devices that may be connected to mud ring 110. Using a single, universal cover 120 may also simplify the installer's job in selecting a mud ring/cover since assembly 100 may accommodate any number of installed devices.

As discussed above, hinged portions 122 may secure cover 120 to mud ring 110, while allowing a user to easily open/close cover 120. In addition, as discussed above, in an exemplary implementation, assembly 100 illustrated in FIG. 1 may be fabricated and sold as a single integrated assembly. This may help eliminate problems during or prior to construction with respect to finding a cover that fits a particular mud ring or utility box, as well as finding the proper screws to attach the cover to the mud ring. In still further implementations, a utility box may be attached to assembly 100 and sold with assembly 100 as an integrated unit. This may further help eliminate problems during installation.

FIG. 2A illustrates a detailed view of hinged area 122 in accordance with an exemplary implementation. Referring to FIG. 2A, hinged area 122 may include side portion 210, hinge 220 and cover portion 230. Side portion 210 may represent a part of raised portion 116 of mud ring 110 located adjacent an upper surface of raised portion 116. Cover portion 230 may represent a part of cover 120 located closest to a side wall of raised portion 116 of mud ring 110. Hinge 220 may connect side portion 210 and cover portion 230, as illustrated in FIG. 2A. For example, referring to FIG. 2A, hinge 220 may be generally U-shaped or V-shaped and may dip or recess to a lower elevation in its middle area than its end areas. That is, the middle portion of hinge 220 may be slightly recessed with respect to the upper surface of portions 210 and 230. This may result in a high stress in hinge 220, which may allow a user to easily break off or detach cover 120 from mud ring 110. For example, hinge 220 may experience a high mechanical stress when bent inwards by moving cover portion 230 back and forth a number of times, such as when opening/partially opening and closing/partially closing cover 120. This high mechanical stress may allow a user to easily break cover 120 from mud ring 110 at hinge areas 122, as described in more detail below.

In addition, the recessed nature of hinge 220 with respect to the upper surface of raised portion 116 may result in the broken hinge/tab area not protruding above the upper surface of mud ring 110 when cover 120 is detached from mud ring 110. That is, hinged area 122 may break cleanly below the upper surface of side portion 210, thereby preventing sharp edges on exposed surfaces of mud ring 110.

FIG. 2B illustrates an alternative implementation of hinged area 122. Referring to FIG. 2B, hinged area 122 may include side portion 240, hinge 250 and cover portion 260. Similar to FIG. 2A, side portion 240 may represent a part of raised portion 116 of mud ring 110 located adjacent an upper surface of raised portion 116. Cover portion 260 may represent a part of cover 120 located closest to the side wall of raised portion 116 of mud ring 110. Hinge 250 may connect side portion 240 and cover portion 260, as illustrated in FIG. 2B. Hinge 250 may be generally U-shaped or V-shaped and may dip or recess to a lower elevation in its middle area that its end areas, similar to hinge 220 in FIG. 2A. In the implementation illustrated in FIG. 2B, however, side portion 240 may include a "split-hinged" configuration. For example, side portion 240 may include small cuts or grooves 242. The part of side portion 240 located between slots 242 may slope downward toward hinge 250, as illustrated in FIG. 2B. In essence, the hinge mechanism includes hinge 250 and a portion of side portion 240. In this implementation, the distance or gap between side portion 240 and cover portion 260 may be smaller than the distance between side portion 210 and cover portion 230 illustrated in FIG. 2A.

Similar to hinge 220 in FIG. 2A, hinge 250 may be slightly recessed with respect to the upper surfaces of portions 240 and 260. This may allow protective cover 120 to be broken away from mud ring 110 when cover 120 is no longer needed and having no pieces (e.g., sharp pieces) protruding above the upper surface of mud ring 110. For example, similar to hinge 220 in FIG. 2A, hinge 250 in FIG. 2B may be a high stress area that is easily broken when bent inwards by moving cover portion 260 back and forth several times. In addition, hinge area 122 in FIG. 2B may break cleanly below the upper surface of side portion 240, thereby preventing sharp edges on exposed surfaces of mud ring 110.

As discussed above, hinged areas 122 may allow a user/installer to protect mud ring 110 and/or devices connected to mud ring 110 (e.g., electrical devices, electrical boxes, etc.) from damage during wall construction or other construction, and also to prevent debris or dirt from entering mud ring 110 and/or devices connected to mud ring 110 (e.g., electrical devices, electrical boxes, etc.). For example, cover 120 may be opened to allow an installer to install an electrical device prior to wall construction. That is, cover 120 may be opened, as illustrated in FIG. 3, to allow an installer to install an electrical device to mud ring 110.

Referring to FIG. 3, the underside or bottom portion of cover 120 may include a cavity 310. Cavity 310 may correspond to the underside of contoured area 128, described above with respect to FIG. 1. As discussed above, contoured area 128 may be contoured to fit a particular electrical device, such as a GFCI duplex receptacle, a toggle type switch, a rocker type switch, etc. In each case, cavity 310 may be sized to fit over the particular device mounted to tabs 126. In other implementations discussed above with respect to FIG. 1, contoured area 128 and corresponding cavity 310 may be sized to fit any number of different electrical devices. That is, cover 120 may essentially be used for installation with any type of electrical device, such as a GFCI duplex receptacle, a toggle switch, a rocker switch, etc., or any communications-related device or connector.

Figure 4:
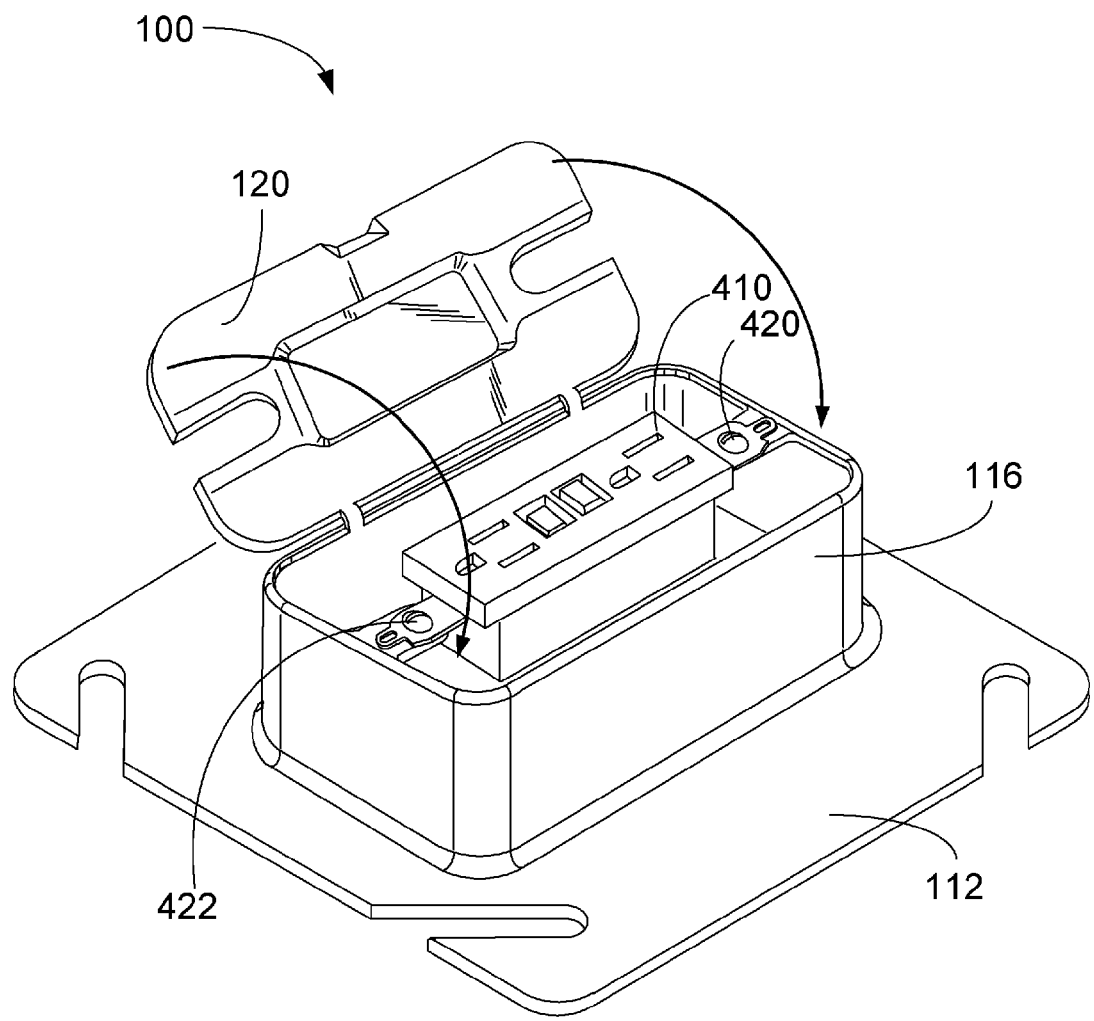
FIG. 4 is a perspective view of the mud ring of FIG. 1 with an exemplary electric device attached thereto.

As one example, FIG. 4 illustrates a GFCI duplex receptacle 410 connected to mud ring 110. Referring to FIG. 4, GFCI receptacle 410 is illustrated as being attached to mud ring 110 via screws 420 and 422 that are threaded into tabs 126. For example, as described above, tabs 126 may be threaded holes that are used to receive screws, such as screws 420 and 422, to secure receptacle 410.

Figure 5:
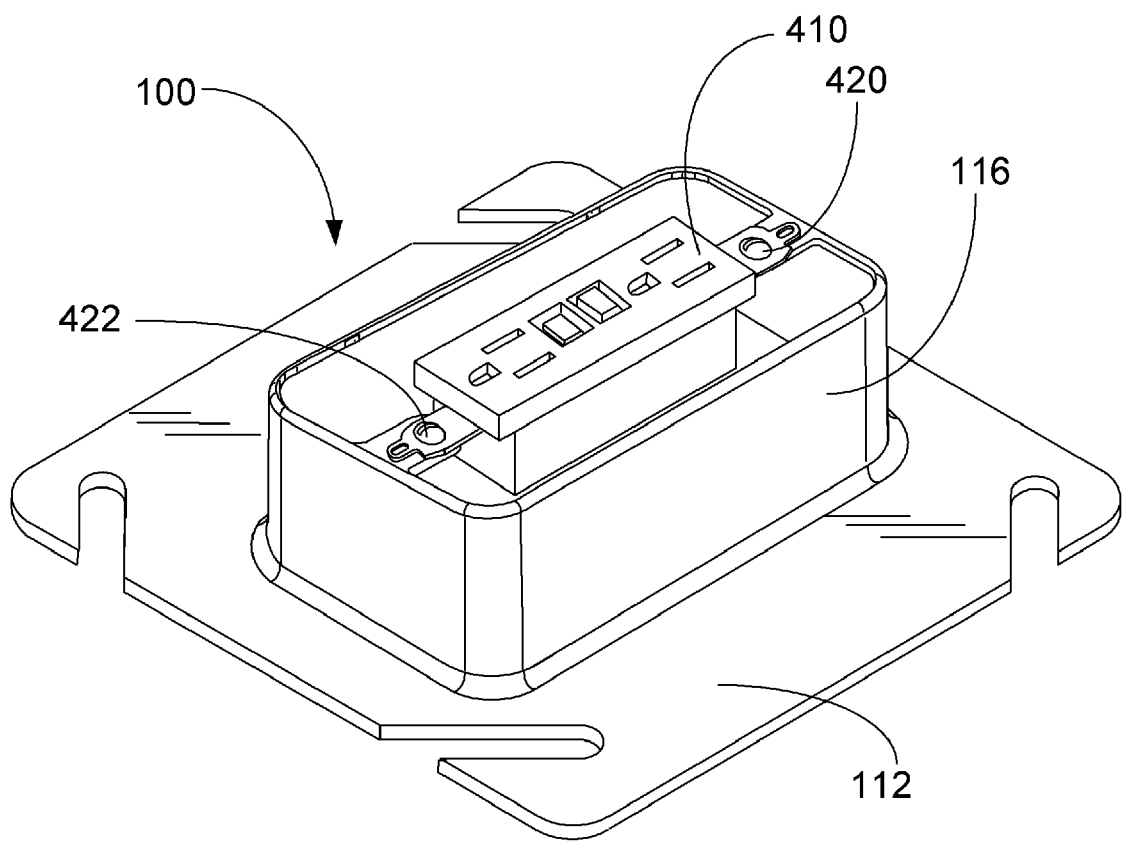
FIG. 5 is a perspective view of the mud ring and electrical device of FIG. 4 with the protective cover removed.

After installation of receptacle 410 (or in some scenarios, prior to installation of receptacle 410 or other device), an installer may remove cover 120 by opening/closing cover 120 several times. For example, as discussed above, hinge 220 (and hinge 250) may be a highly stressed area that is easily broken by opening and closing cover 120 several times. For example, an installer may grasp opener 124 and open/close cover 120 (or partially open/close cover 120) several times. As a result of the stress on hinge 220 (or hinge 250), hinge 220 (or hinge 250) will break away, resulting in receptacle 410 being attached to mud ring 110 with no cover, as illustrated in FIG. 5.

Figure 6:
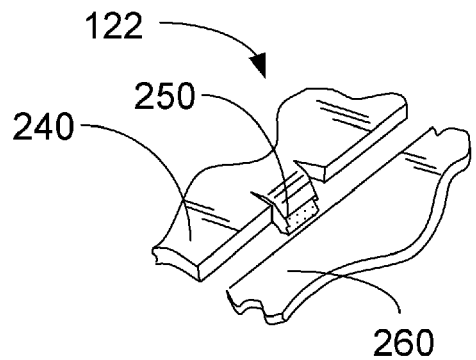
FIG. 6 is a detail illustrating the breaking of the hinged connection illustrated in FIG. 2B according to an exemplary implementation.

FIG. 6 illustrates details associated with breaking hinge 250 of FIG. 2B. As illustrated, hinge 250 may break at its lower portion, which may correspond to the part of hinge 250 experiencing the greatest stress by opening/closing of cover 120. As also illustrated in FIG. 6, the breaking of hinge 250 may result in no sharp edges exposed or protruding above side portion 240.

As described above, hinges 220 and 250 may be easily broken to allow an installer to remove cover 120 after wall construction is completed. That is, during wall construction, cover 120 may protect mud ring 110, an electrical or communication-related device mounted on mud ring 110, and/or an electrical box that may include wiring to the electrical or communication-related device. After wall construction is completed and after holes are cut to expose mud ring 110 and cover 120, the installer may simply open/close cover 120 to detach cover 120 from mud ring 110. A finishing face plate for the electrical or communication device may then be installed.

In some implementations, hinged areas 122 may be partially perforated or pre-punched to further reduce the effort needed to break cover 120 from mud ring 110. For example, hinge 250 (or hinge 220) may be perforated, as indicated by the dotted line in FIG. 2B, to allow an installer to more easily break hinge 250. The perforated or pre-punched area may be pre-punched in a manner similar to pre-punched knock-outs used in electrical utility boxes to allow an installer to easily remove portions of the utility box. This may further simplify the installer's task and may also ensure that hinge 250 is broken at the proper location so that no portion of hinge 250 extends above raised portion 116 of mud ring 110. Hinge 220 may also be perforated to facilitate removal of cover 120.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a mud ring 110 with an integral, protective cover that may be detached at a later time by breaking cover 120 at hinged areas 122. In other implementations, other types of connection mechanisms may be used. For example, various types of tabs or other hinge mechanisms may be used to temporarily secure cover 120 to mud ring 110.

In addition, features have been described above with respect to installing an electrical device to mud ring 110. In some implementations, assembly 100 may come pre-fabricated with an electrical device attached to tabs 126 and pre-wired for connection to an electrical circuit. In further implementations, assembly 100 may come pre-fabricated with an utility box also attached to the mud ring 110 and electrical device. In such implementations, assembly 100 may be sold as a pre-wired assembly with a pig tail or other wires for connection to an electrical circuit. An installer may then simply attach the box/mud ring to wall studs prior to completion of wall constructions (e.g., prior to drywall installation and subsequent cutting) and connect the wires to an electrical circuit.

In addition, various features have been described above with respect to mud ring 110 including an integrated, removable cover. In other implementations, a utility box (e.g., an electrical utility box) may include an integrated, removable cover. That is, in instances where a mud ring may not be needed, an electrical utility box may include an integrated, detachable cover similar to the detachable cover described above.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. An assembly, comprising:
   a ring including:
      a planar surface including slots for mounting the ring to a utility box, and
      a raised portion comprising side walls and end walls, the raised portion being elevated with respect to the planar surface; and
   a detachable cover connected to the raised portion by at least one hinge, the at least one hinge being configured to be broken away from the ring,
   wherein the at least one hinge includes:
      a first portion connected to a first one of the side walls of the raised portion of the ring,
      a second portion connected to the detachable cover, and
      a center portion coupling the first and second portions, wherein the center portion is configured to break in response to moving the detachable cover.
2. The assembly of claim 1, wherein the detachable cover is configured to be detached from the ring without use of a tool.

3. The assembly of claim 2, wherein the at least one hinge includes first and second hinges, wherein each of the first and second hinges is U-shaped or V-shaped and each of the first and second hinges is configured to break in response to a user moving the detachable cover back and forth from an open position to a closed position a plurality of times.

4. The assembly of claim 1, wherein the detachable cover includes a lip or raised area to facilitate opening and closing of the detachable cover.

5. The assembly of claim 1, wherein the center portion of the at least one hinge is perforated or-pre-punched to allow the detachable cover to be broken away from the ring.

6. The assembly of claim 1, wherein the detachable cover comprises metal.

7. The assembly of claim 1, further comprising:
an electrical device connected to the ring.

8. The assembly of claim 7, wherein the electrical device includes wires configured for connecting to an electrical circuit.

9. The assembly of claim 7, further comprising:
a utility box connected to the ring.

10. The assembly of claim 9, wherein the utility box includes wires, one end of each of the wires being coupled to the electrical device and the other end of each of the wires being configured for connecting to an electrical circuit.

11. The assembly of claim 7, wherein the electrical device comprises a duplex receptacle or a switch.

12. A device, comprising:
four side walls and a bottom surface,
at least one hinge mechanism coupled to a first one of the side walls, and
a detachable cover connected to the first side wall by the at least one hinge mechanism,
wherein a center portion of the at least one hinge mechanism is configured to be broken away from the device by moving the detachable cover back and forth from an open or partially open position to a closed or partially closed position a plurality of times.

13. The device of claim 12, wherein the at least one hinge mechanism is configured to be broken away without use of a tool.

14. The device of claim 12, wherein the at least one hinge mechanism comprises first and second hinges connecting the detachable cover to the first side wall, wherein each of the first and second hinges includes:
a first portion connected to the first side wall,
a second portion connected to the detachable cover, and
the center portion connecting the first and second portions, wherein the center portion is recessed with respect to the detachable cover.

15. The device of claim 14, wherein the first side wall adjacent the first hinge includes a first set of grooves or cuts and the first sidewall adjacent the second hinge includes a second set of grooves or cuts, wherein the first portion of the first hinge is located between the first set of grooves or cuts and the first portion of the second hinge is located between the second set of grooves or cuts.

16. The device of claim 12, wherein the at least one hinge mechanism includes a perforated or pre-punched area to facilitate breaking the detachable cover away from the first side wall.

17. The device of claim 12, further comprising:
a utility box coupled to the device.

18. A method, comprising:
attaching a ring to an electrical box, the ring including a detachable cover having at least one hinge to secure the detachable cover to the ring;
attaching an electrical device to the electrical box;
closing the detachable cover during wall construction; and
removing the detachable cover after the wall construction is complete by moving the detachable cover back and forth from a closed or partially closed position to an open or partially open position a plurality of times, wherein the moving the detachable cover breaks the at least one hinge at a center portion of the at least one hinge, wherein the center portion is recessed with respect to side portions of the at least one hinge.

19. The method of claim 18, wherein the removing comprises removing the detachable cover without using a tool.

20. The method of claim 18, further comprising:
perforating or pre-punching the center portion of the at least one hinge to facilitate breaking the at least one hinge at the center portion.

\* \* \* \* \*